United States Patent
Sakamoto et al.

(10) Patent No.: US 6,195,611 B1
(45) Date of Patent: Feb. 27, 2001

(54) ROUTE SEARCH METHOD

(75) Inventors: Tadashi Sakamoto, Tokyo; Yukio Hayashi, Hyogo, both of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/990,799

(22) Filed: Dec. 15, 1997

(30) Foreign Application Priority Data

Jul. 23, 1997 (JP) .................................................. 9-196661

(51) Int. Cl.[7] .................................................. G06F 165/00
(52) U.S. Cl. .................... 701/209; 701/23; 701/201; 701/206; 701/210; 340/988
(58) Field of Search .................................. 701/200, 201, 701/206, 207, 209, 211, 214, 23, 25; 340/988, 990, 995

(56) References Cited

U.S. PATENT DOCUMENTS

| | | | |
|---|---|---|---|
| 5,475,598 | * 12/1995 | Fushimi et al. ...................... | 701/202 |
| 5,506,779 | * 4/1996 | Kanki ................................... | 701/202 |
| 5,513,110 | * 4/1996 | Fujita et al. ......................... | 701/207 |
| 5,787,383 | * 7/1998 | Moroto et al. ....................... | 701/210 |
| 5,916,299 | * 6/1999 | Poppen ................................. | 701/202 |

FOREIGN PATENT DOCUMENTS

| | | |
|---|---|---|
| 63-20700 | 1/1988 | (JP) . |
| 2-260000 | 10/1990 | (JP) . |
| 4-280287 | 10/1992 | (JP) . |

* cited by examiner

Primary Examiner—William A. Cuchlinski, Jr.
Assistant Examiner—Gertrude Arthur
(74) Attorney, Agent, or Firm—Burns, Doane, Swecker & Mathis, LLP

(57) ABSTRACT

A route from a departure point to a destination point is searched. When a route R1 does not exist in a search area A1 which is in the form of an ellipse focusing a departure point S and a destination point E, the area is expanded to a search area A2 to find a route R2.

8 Claims, 12 Drawing Sheets

FIG. 5

| NODE No. | COORDINATES | NUMBER OF LINKS ln | link | dist |
|---|---|---|---|---|
| S | 0, 0 | 2 | N1,N2 | 22.4,32.0 |
| N 1 | 20,10 | 1 | S | 22.4 |
| N 2 | 20,25 | 2 | S,N3 | 32.0,31.6 |
| N 3 | 50,35 | 2 | N2,N4 | 31.6,31.6 |
| N 4 | 80,25 | 2 | N3,E | 31.6,32.0 |
| E | 100,0 | 1 | N4 | 32.0 |

FIG. 6

| N | prev | cost | flg | F |
|---|---|---|---|---|
| | | | | |
| | | | | |
| | | | | |
| | | | | |
| | | | | |
| | | | | |

FIG. 7

| N | prev | cost | flg | F |
|---|---|---|---|---|
| S | – | 0 | 0 | 1.00 |
| | | | | |
| | | | | |
| | | | | |
| | | | | |
| | | | | |

FIG. 8

| N | prev | cost | flg | F |
|---|---|---|---|---|
| S | – | 0 | 1 | 1.00 |
| N1 | S | 22.4 | 0 | 1.03 |
| N2 | S | 32.0 | 0 | 1.16 |
| | | | | |
| | | | | |
| | | | | |

FIG. 9

| N | prev | cost | flg | F |
|---|---|---|---|---|
| S | – | 0 | 1 | 1.00 |
| N1 | S | 22.4 | 1 | 1.03 |
| N2 | S | 32.0 | 0 | 1.16 |
| | | | | |
| | | | | |
| | | | | |

FIG. 10

| N | prev | cost | flg | F |
|---|---|---|---|---|
| S | – | 0 | 1 | 1.00 |
| N1 | S | 22.4 | 1 | 1.03 |
| N2 | S | 32.0 | 1 | 1.16 |
| N3 | N2 | 63.6 | 0 | 1.22 |
| | | | | |
| | | | | |

| N | prev | cost | flg | F |
|---|---|---|---|---|
| S | – | 0 | 1 | 1.00 |
| N1 | S | 22.4 | 1 | 1.03 |
| N2 | S | 32.0 | 1 | 1.16 |
| N3 | N2 | 63.6 | 1 | 1.22 |
| N4 | N3 | 95.2 | 0 | 1.16 |
|  |  |  |  |  |

| N | prev | cost | flg | F |
|---|---|---|---|---|
| S | – | 0 | 1 | 1.00 |
| N1 | S | 22.4 | 1 | 1.03 |
| N2 | S | 32.0 | 1 | 1.16 |
| N3 | N2 | 63.6 | 1 | 1.22 |
| N4 | N3 | 95.2 | 1 | 1.16 |
| E | N4 | 127.2 | 0 | 1.00 |

FIG. 14

| N | prev | cost | flg | F |
|---|---|---|---|---|
| S | - | 0 | 1 | ... |
| N1 | S | 5 | 1 | ... |
| N3 | S | 2 | 0 | ... |
| N2 | N1 | 6 | 1 | ... |
| N4 | N2 | 7 | 0 | ... |
|  |  |  |  |  |

FIG. 16

| N | prev | cost | flg | F |
|---|------|------|-----|---|
| S | -    | 0    | 1   | ... |
| N1 | S   | 5    | 1   | ... |
| N3 | S   | 2    | 1   | ... |
| N2 | N3  | 3    | 0   | ... |
| N4 | N2  | 7    | 0   | ... |
|   |     |     |    |   |

FIG. 17

| N | prev | cost | flg | F |
|---|------|------|-----|---|
| S | -    | 0    | 1   | ... |
| N1 | N2  | 4    | 0   | ... |
| N3 | S   | 2    | 1   | ... |
| N2 | N3  | 3    | 1   | ... |
| N4 | N2  | 4    | 0   | ... |
|   |     |     |    |   |

ROUTE SEARCH METHOD

BACKGROUND OF THE INVENTION

1. Field of the Invention

The present invention is directed to a route search method.

2. Background of the Invention

In a route search of an electronic map, that is, in order to find a route from a departure point to a destination point (the route is, hereinafter, referred to as a specific route), Dijkstra's method has been widely used. However, according to this method, search is made in all directions from the departure point including a direction not related to the specific route, which reduces computational efficiency.

On the other hand, there are also well-known techniques for limiting a search area, or for making a directional search so that unnecessary search is omitted and almost the shortest specific route can be found for a short time. The former technique is, for example, adopted into the Japanese Patent Laid-Open Gazette No. 63-20700, while the latter, for example, into the Japanese Patent Laid-Open Gazettes Nos. 4-280287 and 2-260000.

In the route search method for limiting the search area, an area including the departure point and the destination point is set so that only the area is searched excluding an area unlikely to be included in the specific route. In the directional route search, orientation or distance to the destination point are examined whenever the route is branched at a node. Thus, the branch approaching closer to the destination point is always selected to search the specific route.

However, in the route search method for limiting the search area, the route may expand to the outside of the search area and cannot be searched. Such an example is schematically shown in FIG. 20. Though a departure point S and a destination point E are both included in a limited search area Q, a specific route R goes beyond the search area Q due to the presence of a bay therebetween. Thus, in this route search, it is necessary to set the search area large enough to include any mountains regions or bays between the departure point S and the destination point E. The search of such an area, however, increases the amount of data to be processed, and reduces computational efficiency.

In the directional route search, since the search area is not limited, geographical features between the departure point and the destination point, such as mountains regions and bays, have no influence on the search. However, in this method, the search may end as soon as the first route to the destination point is found without thoroughly reviewing other routes, or the search may take considerably a long time, not easily reaching the destination point.

SUMMARY OF THE INVENTION

A first aspect of the present invention is directed to a route search method for searching a plurality of nodes linked with each other for a specific route from a departure point to a destination point, the plurality of nodes including the departure point and the destination point. The route search method comprises: a judging step of judging which of the plurality of nodes is adopted into the specific route in an search area including the departure point and the destination point, the judging step being repeated when the search area is updated, wherein the search area after updated includes the search area before updated.

Preferably, according to a second aspect of the present invention, in the route search method, the judging step includes the steps of: (a) selecting an expansion node out of the plurality of nodes included in the search area; (b) selecting a node linked with the expansion node as a node ahead of the link, regardless of inside and outside the search area; (c) finding a distance from the departure point via the expansion node to the node ahead of the link; (d) adopting a shorter one of the distances as the accumulated total distance to a first node ahead of the link, when the node ahead of the link obtained by the step (b) is common to the first node ahead of the link with a different expansion node, every time the step (c) is performed on the different expansion node; and (e) finding the specific route by linking the expansion node giving the accumulated total distance adopted in the step (d), wherein at least the steps (a) and (b) is performed on a node which has not been adopted as the expansion node yet.

According to a third aspect of the present invention, in the route search method, the steps (a) and (b) is performed also on a node which has already been adopted as the expansion node.

A fourth aspect of the present invention is related to a route search method for searching a plurality of nodes linked with each other for a specific route from a departure point to a destination point, the plurality of nodes including the departure point and the destination point. The route search method comprises: a judging step of judging which of the plurality of nodes is adopted into the specific route in a search area including the departure point and the destination point, wherein the search area is in the form of an ellipse focusing the departure point and the destination point.

In the route search method of the first aspect, search is at first made in a small limited search area. Thus, a straight specific route connecting the departure point and the destination point, if existing, can be found for a short time, which can complete the process at high speed. Further, even if including geographical features such as mountains regions and bays, the search area can be extended until including the specific route within its range. Thus, the specific route can be found in such a condition. Since the search area is extended only when few node is included between the departure point and the destination point because of, for example, geographical features such as mountains regions and bays, the extension of the search area would hardly increase the amount of data to be processed. Thus, the process can be performed relatively at high speed.

Moreover, since the search area is modified sequentially by the extension in this route search, the shorter route is very likely to be searched, compared to the directional route search in which the search area is not limited.

In the route search method of the second aspect, the distance from the departure point via the expansion node to the first node ahead of the link is found, and the expansion nodes giving the shortest distance are linked with each other to find the specific route. Thus, at least the specific route found by this method cannot be the longest one within the searched range.

In the route search method of the third aspect, if another expansion node further shortening the accumulated total distance is found on the way the expansion nodes are linked with each other from the departure point to find the specific route, the specific route which has already been found is even modified. Thus, the specific route found by this method can be the shortest one at least within the searched range.

In the route search method of the fourth aspect, as long as the search area includes the relay points connecting the departure point and the destination point by straight routes, respectively, even if the relay points are on the opposite side to the destination point viewed from the departure point or on the opposite side to the departure point viewed from the destination point, the sum of the distances of those routes becomes not more than a certain value. That is, the specific route taking the accumulated total distance of not more than a predetermined value can be found by defining the search area as a predetermined size of an ellipse and then searching the area for the route including the relay points.

The object of the present invention is to find the shortest route from the departure point to the destination point for a short processing time.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a table including coordinates of a node, the number of links, a node ahead of the link, a distance to the node ahead of the link.

FIGS. 6 through 12 sequentially show lists adopted in the first preferred embodiment in order of the procedure.

FIG. 13 illustrates a route search object according to a second preferred embodiment of the present invention.

FIGS. 14, 16 and 17 sequentially show lists adopted in the second preferred embodiment in order of the procedure.

DESCRIPTION OF THE PREFERRED EMBODIMENTS

A. Basic Thought

Before going over details of preferred embodiments of the present invention, two basic thoughts of the present invention will be described. Each thought is not based on the assumption that the other thought is adopted, but as will be described in the preferred embodiments, both of the thoughts may be adopted together, with a first thought accompanied with a second thought.

A-1. Extension of Search Area

In accordance with the first thought of the present invention, a search area is set by using a fixed function in relation to a departure point and a destination point (hereinafter, referred to as an evaluation function). The evaluation function has a parameter called an evaluation criterion, the change of which can alter the size of the search area. Here, the evaluation function is set so that a larger search area includes a smaller one when the evaluation criterion is altered.

Figure 20:
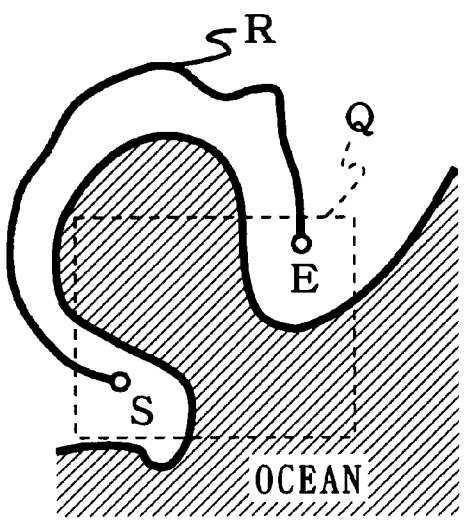
FIG. 20 helps to explain a conventional problem.

First, the evaluation criterion is set at an initial value, and, from two coordinates of a departure point S and a destination point E, an initial value of the search area is set. The route search is made only within the search area. Thus, when the route is not found within the search area as shown in FIG. 20, for example, the evaluation criterion is altered to extend the search area and make a search again. Repeating extension of the search area and search until the route is found, the route search process can be performed at high speed as well as keeping up with various geographical features. The form of the search area may be a rectangle, or an ellipse as will be described later with regard to the second thought.

When the evaluation criterion is updated to make a search again, the extended search area includes the previous one. Thus, the search this time may continue the previous search. More specifically, without repeatedly evaluating the area which has already been searched, only an area not searched in the new search area may be searched by using all relay points found by the previous search and all data allotted to the departure point and the destination point. Repeating the search in this way, the search process can be more effectively performed compared to the search in which the search data is reproduced from the beginning when search is made again.

According to the first thought, since the small limited search area is searched at the beginning, the specific route connecting the departure point and the destination point in a straight line, if existing, can be found at an early stage of the search, which completes the process at high speed. Further, when search is made in an area including geographical features such as mountains regions and bays, the search area is extended until including the specific route. Thus, the specific route can be found as long as existing. Since the search area is extended only when few node is included between the departure point and the destination point because of the geographical features such as mountains regions and bays, the extension of the search area hardly increases the amount of data. Thus, the process can be performed relatively at high speed.

Moreover, since the area to be searched for the route is sequentially extended and modified, the shorter route is more likely to be found compared to the directional route search in which the search area is not limited.

Of course, even the shorter specific route can be found by repeatedly evaluating the search area which has already been searched before when search is made again. The Dijkstra's method teaches to expand a node (including the departure point, the destination point, and the relay point therebetween) in order of the node giving the shorter accumulated total distance from the departure point. Thus, the accumulated total distance once determined is the shortest cost of the node and thus is not modified. However, since the extended search area is searched for a new route in the route search method according to the present invention, the accumulated total distance to the node adopted into this new route may be shorter than that once determined by the previous search. In that case, even if the node is included in the previous search area, the accumulated total distance to the node is modified. This causes an increase of the processing time because the accumulated total distance to the node once determined by the previous search is evaluated again, but at the same time enables detection of the further optimum route.

As described above, the first thought enables a desirable search meeting its purpose by selecting whether to modify the accumulated total distance found by the previous search or not.

The Japanese Patent Laid-Open Gazette No. 8-122089 discloses a technique for sequentially extending the search area, in which one boundary of the search area is selected and a new search area is shifted in the direction including this boundary. On the other hand, the first thought of the present invention is different in that the search region including the previous search region is extended in any directions.

A-2. Form of Search Area

The purpose of the route search is to find the shortest specific route. Thus, if existing, a straight route connecting the departure point and the destination point (hereinafter referred to as a zero-order destination route) becomes the specific route. However, if the zero-order destination route does not exist, but if there is a route formed of a straight route WSN connecting the departure point S and a relay point N, and a straight route WNE connecting the relay point N and the destination point E, where N is a relay point closest to a straight line RSE connecting the departure point S and the destination point E, the route (hereinafter referred to as a primary destination route) is very likely to be the specific route.

Figure 21:
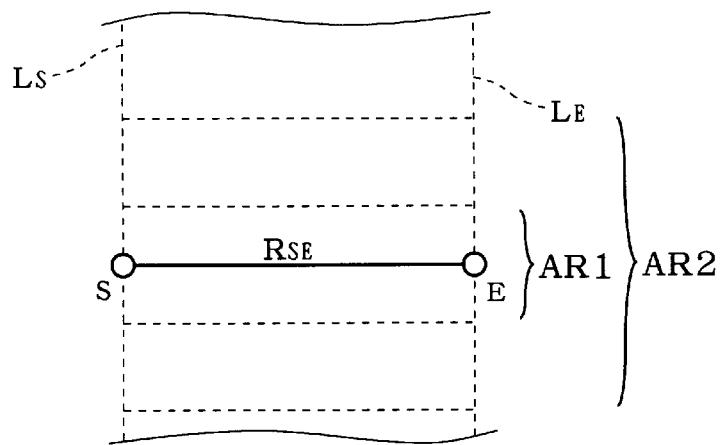
FIGS. 21 and 22 help to explain a first thought of the present invention.

FIG. 21 shows an example of the extension of the search area in order to search the relay point N in accordance with the first thought. Virtual lines LS and LE are both perpendicular to the straight line RSE, and the departure point S and the destination point E are on the virtual lines LS and LE, respectively. Search areas AR1 and AR2 are sandwiched between the virtual lines LS and LE.

When a relay point is included in the area sandwiched between the virtual lines LS and LE, even if another relay point exists outside the area, the former relay point is more likely to be linked with the shortest specific route than the latter. Thus, when the search area AR1 is extended to the search area AR2 in accordance with the first thought because no relay point is included therein, the search area is extended in the direction to which the virtual lines LS and LE lie.

Figure 22:
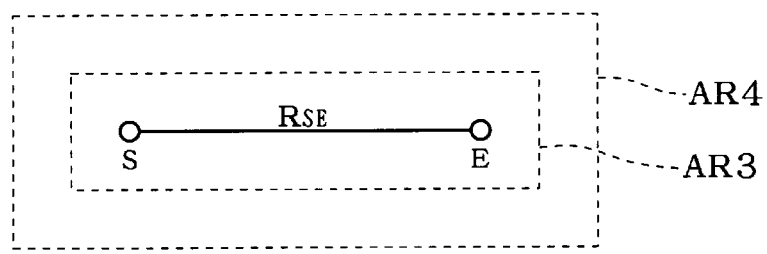

However, since the relay point is not always included in the area sandwitched between the virtual lines LS and LE, it is undesirable to limit the search area to the area between the virtual lines LS and LE. FIG. 22 shows another example of the extension of the search area to search the relay point N in accordance with the first thought. A rectangular search area AR3 includes parts both on the opposite side to the destination point E viewed from the departure point S and on the opposite side to the departure point S viewed from the destination point E. When the first thought is adopted, search is made in a search area AR4 which is a larger rectangle than the search area AR3.

The search area as described above is inefficient because the area, including the relay point unlikely to be linked with the shortest specific route, will be searched as well.

In accordance with the second thought of the present invention, the search area is in the form of an ellipse focusing the departure point S and the destination point E so that the parts both on the opposite side to the destination point E viewed from the departure point S and on the opposite side to the departure point S viewed from the destination point E are included but not overly.

Figure 23:
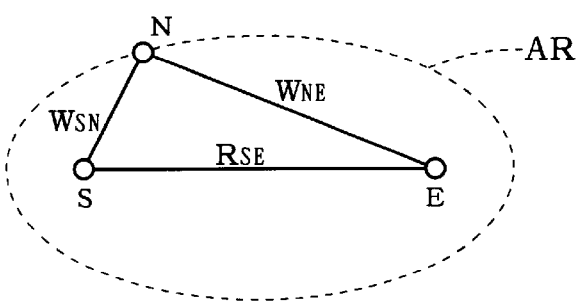
FIG. 23 helps to explain a second thought of the present invention.

FIG. 23 shows that the search area is in the form of an ellipse. When there is a plurality of relay points each of which is linked with a corresponding primary destination route, the elliptical search area makes it possible to find the primary destination route taking the shortest accumulated total distance (distance of the route from the departure point S to the destination point E), as the specific route. That is, when the process is performed in accordance with the first thought, a tolerable value for the whole cost of the primary destination route is increased by sequentially extending an elliptical search area AR, and thus the relay point obtained for the first time by the extension of the search area is very likely to be linked with the primary destination route requiring the minimum cost. This thought is based on the fact that, as long as the elliptical search area AR includes the relay point N linked with the departure point S and the destination point E by the straight routes WSN and WNE, respectively, the sum of the costs of the routes WSN and WNE is not more than a certain value irrespective of the position of the relay point (even if the relay point is included in the areas on the opposite side to the destination point E viewed from the departure point S or on the opposite side to the departure point S viewed from the destination point E).

Here, the second thought is not necessarily based on the assumption that the first thought is adopted. The route search may be made in such a way that the maximum tolerable value for the whole cost of the route is predetermined and then sequentially reduced to narrow the elliptical search area so that the smallest search area including the relay point N directly or indirectly linked with the departure point S and the destination point E can be searched by using a well-known technique.

B. Preferred Embodiments of Present Invention

B-1. Outline

Figure 1:
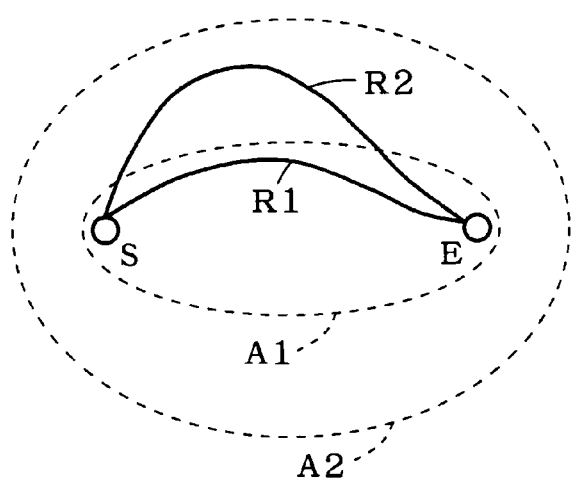
FIG. 1 helps to explain an outline of the present invention.

The preferred embodiments of the present invention, which will be described in detail below, have adopted both of the first and second thoughts. FIG. 1 shows correlation among a departure point S, a destination point E, routes R1 and R2 connecting those points, and elliptical search areas A1 and A2 focusing the departure point S and the destination point E. When the route R1 does not exist in the search area A1, the range to be searched is extended to the search area A2 to find the route R2.

Although, a link between each node is shown by a straight line in all figures referred to in the following description, the length of the straight line does not always correspond to the distance between each node. That is, just drawn by a straight line, actual geographical features such as curves and heights are not exactly shown. However, correlation between the position of each node and the search area, which is considerably significant for the present invention, is not ruined in the figures.

B-2. First Preferred Embodiment

Figure 2:
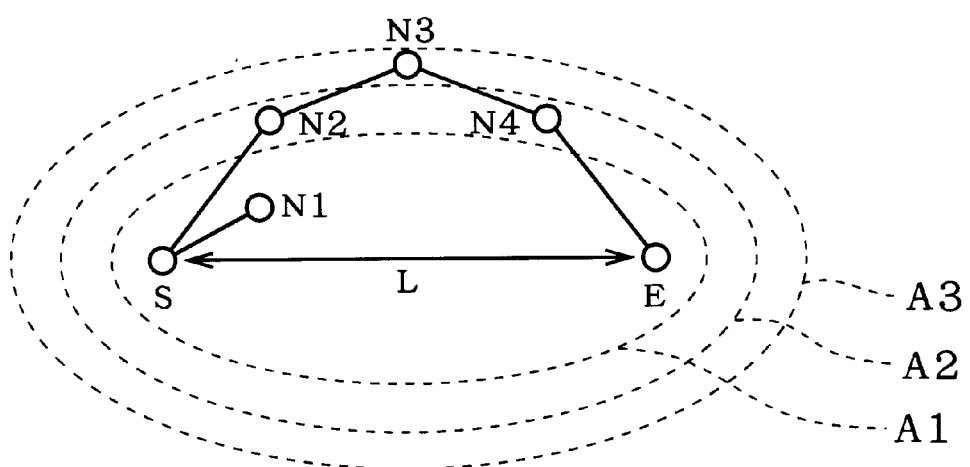
FIG. 2 illustrates a route search object according to a first preferred embodiment of the present invention.
Figure 3:
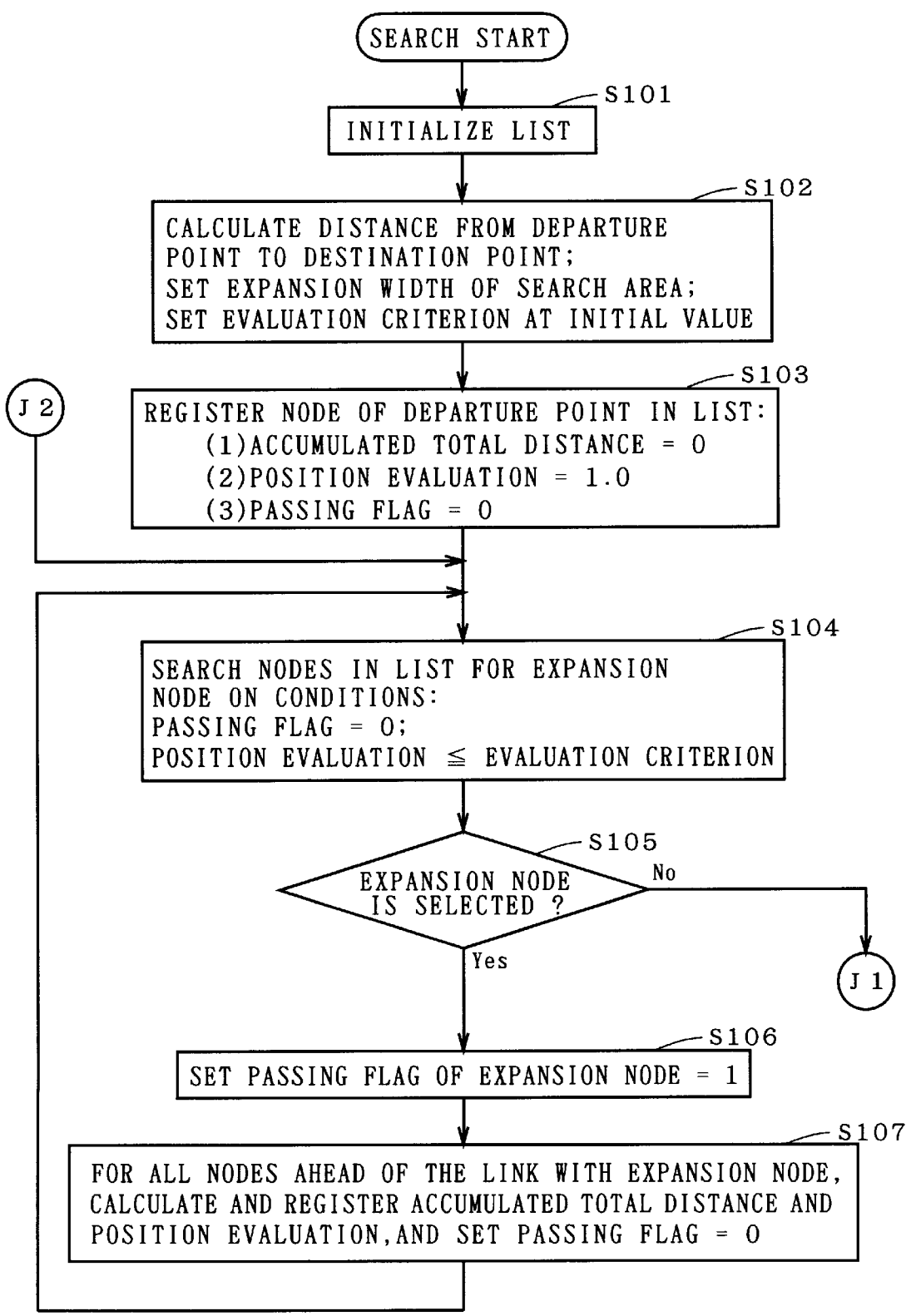
FIGS. 3 and 4, taken together, illustrate a flow chart illustrating a route search procedure according to the first preferred embodiment.
Figure 4:
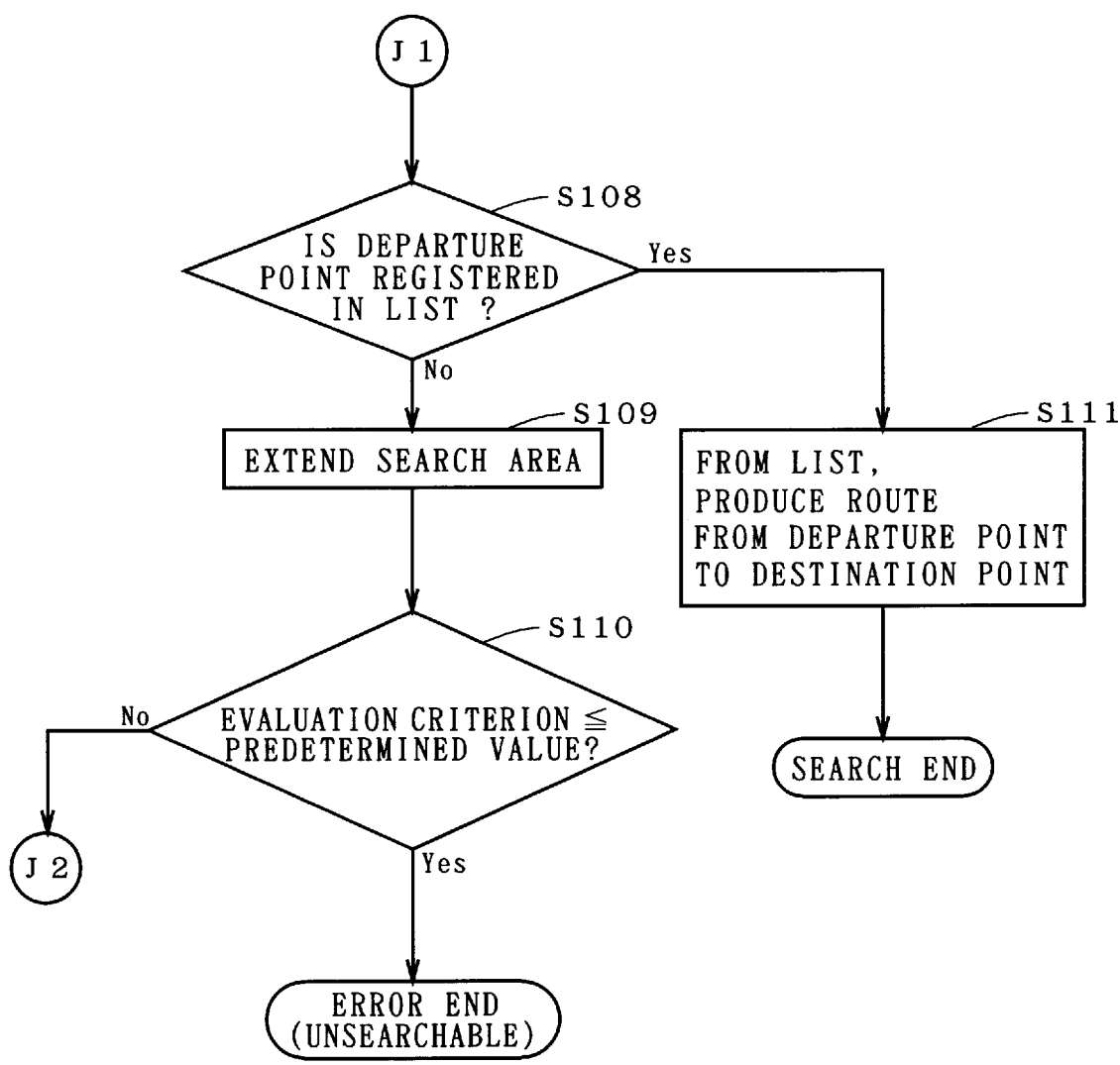

FIG. 2 schematically shows the departure point S, the destination point E and relay points N1 through N4, all of which form a route search object according to a first preferred embodiment. FIGS. 3 and 4, taken together, show a flow chart illustrating a route search procedure according to this preferred embodiment.

FIG. 5 is a table including coordinates of each node shown in FIG. 2, the number of links ln, a node ahead of the link link, a distance to each node ahead of the link disc. For example, referring to FIG. 2, the departure point S is linked with the two relay points N1 and N2. Thus, the number of links ln and the node ahead of the link link of the departure point S are "2" and "N1, N2", respectively, as shown in FIG. 5.

Referring to FIG. 3, when the route search starts, a list is first initialized at a step S101. Here, the list stores information such as an accumulated total distance of the route from the departure point S to each node in the search process. Thus, at the end of the search, a completed route from the departure point S to the destination point E will be stored in the list.

FIG. 6 shows the list used in this preferred embodiment. The list items include a node number N, a previous node number prev searched previous to the node numbered N, an accumulated total distance cost, a passing flag flg, and a position evaluation F. At the step S101, a blank list with no items filled is prepared as shown in FIG. 6.

Referring back to FIG. 3, a distance L between the departure point S and the destination point E is found at a step S102. The distance L indicates a straight-line distance between the departure point S and the destination point E, found by:

$$L = \sqrt{(ex-sx)^2 + (ey-sy)^2} \qquad (1)$$

where sx, sy and ex, ey are the coordinates of the departure point S and the destination point E, respectively.

In this preferred embodiment, the search area is in the form of an ellipse focusing the departure point S and the destination point E. Thus, introducing an evaluation criterion φ, the coordinates (px, py) at the boundary of the search area satisfy the following equation:

$$\varphi = \frac{\sqrt{(px-sx)^2 + (py-sy)^2} + \sqrt{(px-ex)^2 + (py-ey)^2}}{L} \qquad (2)$$

As the evaluation criterion φ increases, the boundary of the search area further deviates from the zero-order destination route. In the extreme case where φ=1, the search area corresponds to the zero-order destination route. When the route connecting the departure point S and the destination point E is found for the first time by increasing the evaluation criterion φ by a predetermined extension width step to extend the search area, the route is basically to be adopted as the shortest route. For example, when step=0.1, the search area is extended by 10% of the distance L.

In the equation (2), the evaluation criterion φ can be read as the position evaluation F of the relay point (node) by reading px and py as the coordinates of the relay point. In other words, the search of the search area for the relay point indicates the search for the relay point whose position evaluation F is smaller than the evaluation criterion φ of the search area. The position evaluation F of each node is found by the coordinates of the node shown in FIG. 5.

At the step S102, an initial value of the evaluation criterion φ is set, for example, at 1.1 in order to set the first search area (corresponding to the search area A1). Further, the extension width step, by which the evaluation criterion φ is increased, is also set when the search area is extended.

After the step S102, the departure point S is registered in the list at a step S103. FIG. 7 shows the list at this stage. There is no previous node prev searched before the present node, and the accumulated total distance cost is "0". The passing flag flg takes the value of either "1" or "0" depending on whether the accumulated total distance to the corresponding node has been determined or not. Thus, at the step S102, the passing flag flg is set at "0". The position evaluation F of the departure point S is "1".

After registering the departure point S in the list, the process proceeds to a step S104 where an expansion node is searched out of the nodes registered in the list. Here, the expansion node needs to satisfy two conditions: its passing flag flg is "0"; and the search area includes the expansion node. In other words, the position evaluation F of the expansion node, excluding the destination point E, has to be smaller than the evaluation criterion φ.

If there are a plurality of nodes satisfying those two conditions, the node giving the shortest accumulated total distance cost is adopted as the expansion node because the purpose of the route search is to find the specific route taking the shortest accumulated total distance.

As shown in FIG. 7, the list includes the departure point S whose passing flag flg is "0". Since the position evaluation F of the departure point S is "1" while the evaluation criterion φ is "1.1", the departure point S is adopted as the expansion node. Thus, the answer to the inquiry of a step S105, "Is the expansion node selected ?", is "yes", and then the process proceeds to a step S106.

At the step S106, the passing flag flg of the adopted expansion node is set at "1", which means that the node has been adopted as the expansion node and its accumulated total distance has been determined. Thus, when the process next comes to the step S104, this node is excluded from the search object of the expansion node.

The process proceeds to a step S107 where a node ahead of the link with the expansion node is registered in the list and the accumulated total distance to each node is calculated to obtain the position evaluation. If there is a node not registered in the list, this node ahead of the link with the expansion node is newly registered in the list. Since the accumulated total distance to this newly registered node has not been determined, its passing flag flg is set at "0".

If the node ahead of the link with the expansion node has already been registered in the list, and at least its passing flag flg is "0", the accumulated total distance when the route passes this expansion node is compared with the accumulated total distance which has already been registered in the list. If the former is shorter than the latter, the list is modified; if the latter is shorter, the list is not modified. As to the case where the former is shorter but the passing flag flg of the node ahead of the link is "1", whether to modify the list or not will be described later in other preferred embodiments.

As is obvious from FIGS. 2 and 5, the node S has two nodes ahead of the link N1 and N2. Since not included in the list at this stage, the nodes N1 and N2 are newly registered in the list.

As the accumulated total distance cost of the node N1, a distance found by adding the distance disc of the route between the nodes S and N1 to the accumulated total distance cost to the node S1 is registered. Since the accumulated total distance cost to the node S is 0 and the distance disc of the route between the nodes S and N1 is 22.4, the accumulated total distance cost to the node N1 becomes 22.4. And, the node S is registered as the previous node prev of the node N1. When the node N1 is registered in the list, its passing flag flg is set at "0". The position evaluation F of the node N1 is found by the coordinates shown in FIG. 5, and registered in the list. Here, since L=100, the equation becomes as follows:

$$F = \frac{\sqrt{(20-0)^2 + (10-0)^2} + \sqrt{(20-100)^2 + (10-0)^2}}{100} \qquad (3)$$

$$\approx 1.03$$

In the same manner, the node N2 is newly registered in the list as well. The accumulated total distance cost and the position evaluation F of the node N2 are 32.0 and 1.16, respectively. FIG. 8 shows the list after the step S107 is completed.

Then, the process returns to the step S104 to select the expansion node out of the nodes in the list. At this stage, the nodes whose passing flag flg is "0" are N1 and N2. However, the position evaluation F of the node N2 is larger than the present evaluation criterion φ of "1.1" while that of the node N1 is smaller. Thus, only the node N1 is adopted as the expansion node.

Since the expansion node can be selected out of the nodes in the list, the process proceeds through the step S105 to the step S106 where the passing flag flg of the expansion node N1 is set at "1".

At the step S107 the node ahead of the link with the node N1 is registered in the list. As is obvious from FIGS. 2 and 5, the node ahead of the link with the node N1 is only the node S. Since the node S has already been registered in the list as shown in FIG. 8, new register is not performed. Then, the accumulated total distance from the present expansion node N1 to the node S is compared with the accumulated total distance which has already been registered in the list. As the former is 22.4+22.4=44.8 and the latter is 0, the list is not modified.

Since the node N1 has no other node ahead of the link, the process after the step S107 returns to the step S104. FIG. 9 shows the list at this stage.

Though the passing flag flg of the node N2 is "0" in the list, its position evaluation F is 1.16 which is bigger than the present evaluation criterion φ of "1.1". Thus, no expansion node is selected at the step S104. Then, through the step S105, the process proceeds via the connector J1 to a step S108 shown in FIG. 4.

At the step S108, whether the search is completed or not is judged. That is, whether the node of the destination point E has been registered in the list or not is judged. When the node is registered, the process proceeds to a search end process (step S111). When not registered, the process proceeds to steps S109 and S110 where the search area is expanded to make a search again.

Since the present list shown in FIG. 9 does not include the destination point E, the process proceeds through the step S108 to the step S109. At the step S109, the evaluation criterion φ is increased by the extension width step to expand the search area. This time, the evaluation criterion φ is modified from 1.1 to 1.2 (corresponding to the search area A2).

At the step S110, whether an error occurs or not is checked. To prevent an endless expansion of the search area when no route to the destination point E is found, the maximum value of the search area is set so that, when no route is found until reaching the maximum value, the process can stop regarding the route as unsearchable. That is, when the evaluation criterion φ exceeds a predetermined value, this is considered as an error and the process stops. Too high maximum value increases the search in number, requiring a considerable time to stop the process as an error. Thus, the maximum value may be set within the range from 2.0 to 3.0.

Since the search is continued if the evaluation criterion φ is below a predetermined value at the step S110, the process returns via a connector J2 to the step S104 shown in FIG. 3. Though the contents of the list is the same with the last one when the step S104 is processed, since the evaluation criterion φ is increased to 1.2, the node N2 is adopted as the expansion node this time. Then, the process proceeds through the step S105 to the step S106 where the passing flag flg of the node N2 is set at "1".

As is obvious from FIGS. 2 and 5, the nodes ahead of the link with the node N2 are the nodes S and N3. Since the node S has already been registered in the list and its accumulated total distance cost in the list is shorter than the accumulated total distance when the route passes the node N2, the list is not modified.

The node N3, on the other hand, is not included in the list, and thus newly registered. The accumulated total distance cost to the node N2 is 32.0, and the distance disc between the nodes N2 and N3 is 31.6, so that, from the sum of those values, the accumulated total distance cost to the node N3 is calculated at "63.6". Further, the previous node prev and the position evaluation F of the node N3 are "N2" and "1.22", respectively. FIG. 10 shows the list at this stage.

Then, the process returns to the step S104. Though the passing flag flg of the node N3 is "0" in the list, since F=1.22>φ=1.2, the node is not adopted as the expansion node. Thus, the process proceeds through the step S105 to the step S108, and, since the destination point E is not in the list, proceeds to the step S109, where the evaluation function φ is increased to 1.3 (corresponding to the search area A3). Then, through the step S110 and via the connector J2, the process returns to the step S104.

Since F=1.22≦φ=1.3, the node N3 is adopted as the expansion node. Through the step S105, the passing flag flg of the node N3 is set at "1" at the step S106. Then, at the step S107, the nodes N2 and N4 are registered in the list as the nodes ahead of the link with the node N3. The accumulated total distance cost to the node N2, which has already been registered in the list, is 32.0, while the accumulated total distance cost to the node N3 is 63.6. Thus, the node N2 reached not via the node N3 (reached directly from the node S) gives the shorter the accumulated total distance cost, so that the list is not modified.

Figures 11, 12, 13:
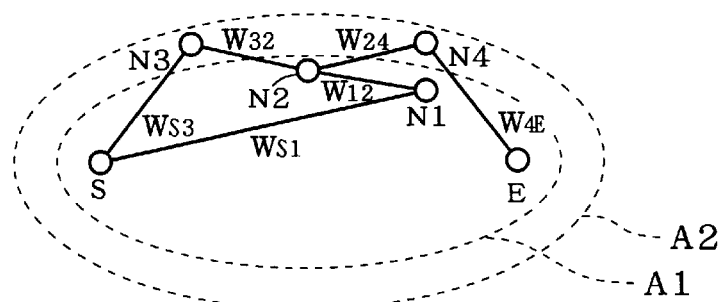

On the other hand, the node N4 is not included in the list, and thus newly registered. The previous node prev, the accumulated total distance cost, and the position evaluation F of the node N4 are N3, 63.6+31.6=95.2, and 1.16, respectively. FIG. 11 shows the list at this stage.

When the process returns to the step S104, the node N4 is adopted as the expansion node since F=1.16≦φ=1.3 and its passing flag flg is "0". Then, the process proceeds through the step S105 to the step S106, where the passing flag flg of the node N4 is set at "1". At the step S107, the nodes N3 and E are registered in the list as the nodes ahead of the link with the node N4. The accumulated total distance cost to the node N3, which has already been registered in the list, is 63.6, while the accumulated total distance cost to the node N4 is 95.2. Thus, the node N3 reached not via the node N4 (reached directly from the node N2) gives the shorter accumulated total distance cost, so that the list is not modified.

The destination point E is not included in the list, and thus newly registered. The previous node prev, the accumulated total distance cost, and the position evaluation F of the node E are N4, 95.2+32.0=127.2, and 1, respectively. FIG. 12 shows the list at this stage.

Then, the process returns to the step S104 where the expansion node is searched. However, excluded from the search object, the node E is not adopted as the expansion node. Thus, the process proceeds through the step S105 to the step S108 to judge whether the search is completed or not.

Since the destination point E is included in the list at this stage as shown in FIG. 12, the process proceeds to the step S111. At the step S111, the previous nodes prev in the list are traced in order from the destination point E, and a route data from the departure point S to the destination point E is produced. This is the end of the route search process.

According to this preferred embodiment as described above, the destination point E is reached from the departure point S by tracing the expansion node giving the shorter accumulated total distance cost from the departure point S, so that the shorter route can be found. Besides, since with the first thought adopted, the same effect as described above can be obtained while the problems in the directional route search can be prevented and the amount of data can be reduced by making a search only of a necessary search area. Further, with the second thought adopted together with the first thought, only a necessary search area can be expanded without including an unnecessary wide area.

B-3. Second Preferred Embodiment

Even if the cost of a node has been determined by the previous search, when the node is linked with a new route, the accumulated total distances to the node and to its node ahead of the link may become shorter. This possibility is considered higher in the vicinity of the boundary of the previous search area, because the node, obtained at the step S107 but not adopted as the expansion node at the step S104, is very likely to be positioned in the vicinity of this boundary.

According to this preferred embodiment, at the step S107 shown in FIG. 3, the accumulated total distance when the route passes the present expansion node is compared with the accumulated total distance which has already been registered in the list. When the former is shorter than the latter, the list is modified even if the passing flag flg of the node ahead of the link is "1", which will be described in detail.

FIG. 13 schematically shows a route search object according to this preferred embodiment, including the departure point S, the destination point E and the relay points N1 through N4. Though the link between each node is shown by a straight line in this figure, the length of the link is indicated by the reference character allotted to the straight line, where WS1=5, WS3=2, W32=W12=W24=W4E=1.

The search area A1 is an initial search area, and the search area A2 is what the search area A1 is extended.

FIG. 14 shows a list when the search of the search area A1 is completed (at the step S109 shown in FIG. 4). Not used in the description of this preferred embodiment, the value of the position evaluation F is omitted. The nodes N1 and N2 included in the search area A1 have been adopted as the expansion node, and then the nodes N3 and N4, the nodes ahead of the link with the node N2, have been registered in the list at the step S107. Since the nodes N3 and N4 are not included in the search area A1, the process now proceeds via the connector J1 to the step S108.

When the node N3 is the previous node prev of the node N2, the to the node N2 is 2+1=3. This is shorter than the accumulated total distance cost of 5+1=6 when N1 is the previous node prev of the node N2. However, since not included in the search area A1, the node N3 has not been adopted as the expansion node and thus cannot be the previous node prev of the node N2 at this stage. Thus, the node N1 included in the search area A1 is registered as the previous node prev of the node N2.

Since the destination point E is not registered in the list in the search of the search area A1, the process proceeds to the step S109, where the search area is extended to the search area A2, and returns via the connector J2 to the step S104 to make a search again.

The search area A2 includes the nodes N3 and N4, so that either one of which is adopted as the expansion node. As described in the first preferred embodiment, if there is a plurality of nodes satisfying two conditions for the expansion node, the node giving the shorter accumulated total distance cost is adopted as the expansion node. Thus, in this case, the node N3 is adopted. Then, through the steps S105 and S106 where the passing flag flg of the node N3 is set at "1" the process proceeds to the step S107.

Figure 15:
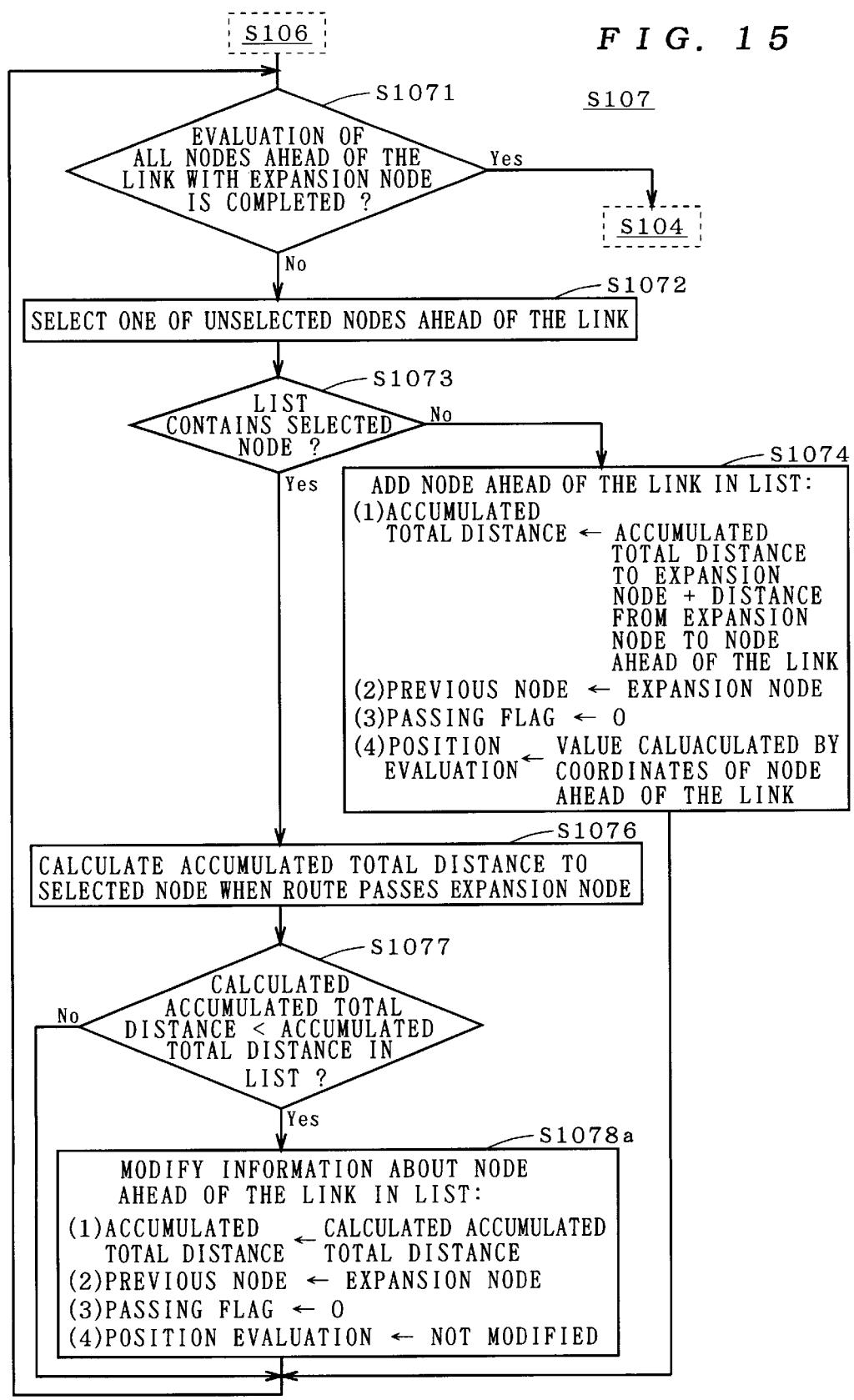
FIG. 15 is a flow chart illustrating a route search procedure according to the second preferred embodiment.

FIG. 15 is a flow chart illustrating the detail of the step S107 employed in this preferred embodiment. First, whether evaluation of all nodes ahead of the link with the expansion node have been completed or not is judged at a step S1071. That is, information as to all nodes ahead of the link with the present expansion node, such as the accumulated total distance cost, has been found or not is judged. Even if the information as to the same node ahead of the link with other expansion nodes has already been found, this does not meet the condition of the step S1071. In the present case, since any node has not been evaluated yet as the node ahead of the link with the present expansion node N3, the process proceeds to a step S1072.

At the step S1072, one node not selected before is selected out of the nodes ahead of the link with the expansion node. In this case, the node S is first selected. Then, the process proceeds to a step S1073 where whether the selected node has already been registered in the list or not is judged. Since the node S selected at the step S1072 has already been registered in the list, the process proceeds to a step S1076.

At the step S1076, the accumulated total distance to the selected node when the route passes the expansion node is calculated. In the present stage, the accumulated total distance cost to the node S when the route passes the node N3 is calculated at 4. Then, at a step S1077, the accumulated total distance found this time is compared with the accumulated total distance to the node S which has already been registered in the list. In the present stage that the former is longer than the latter, the process returns to the step S1071. The case described in the first preferred embodiment is when the former is longer than the latter at the step S1077.

Then, the process proceeds again through the step S1071 to the step S1072, and the node N2 is selected at this time. Since the node N2 has already been in the list as well, the process proceeds through the step S1073 to the step S1076 The accumulated total distance cost to the node N2 calculated at this step is "3", which is shorter than the accumulated total distance cost of "6" which has already been registered in the list. Thus, the process proceeds through the step S1077 to the step S1078a.

Though the passing flag flg of the node N2 is "1" indicating that its accumulated total distance cost has once been determined (or the node has once been adopted as the expansion node), the information as to the node N2 is modified at the step S1078a. More specifically, the accumulated total distance cost to the node N2 is modified by the newly calculated value; the present expansion node is adopted as the previous node prev of the node N2; and the passing flag flg of the node N2 is set at "0". By modifying the list in this way, a newly found and more advantageous route via the node selected at the step S1072 can be continuously searched. The position evaluation F is peculiar to each node and thus is not modified. FIG. 16 shows the list at this stage.

Since the evaluation of the nodes S and N2 as the nodes ahead of the link with the expansion node N3 is completed at the step S1071, the process returns to the step S104.

Then, the expansion node is searched at the step S104. Out of the nodes N2 and N4 which are the candidates for the expansion node, the node N2 is selected since the accumulated total distance cost to the node N2 is shorter. Then, the process proceeds through the step S105 to the step S106, where the passing flag flg of the node N2 is set at "1".

The process proceeds to the step S107 and at the step S1072, either one of the nodes N1, N3, or N4 is selected. When the node N3 is selected, the process returns to the step S1071 through the steps S1073, S1076, and S1077. On the other hand, when either of the nodes N1 or N4 is selected, the process proceeds from the step S1077 to S1078a because the newly found accumulated total distance to each of the node is smaller than the accumulated total distance which has already been registered in the list. Thus, the list after the process of the step S1078a becomes as shown in FIG. 17.

Then, the process returns to the step S104, where either of the nodes N1 or N4 is adopted as the expansion node. If the node N4 is adopted, the destination point E is selected at the step S1072, and the process proceeds to a step S1074 through the step S1073.

Since the destination point E is detected at this stage, the search process is completed by the search of the search area A2. That is, the shortest route, S→N3→N2→N4→E, can be detected The process of the step S1074 has already been described in the first preferred embodiment. To be concrete, the accumulated total distance cost to the newly registered node is found by the sum of the accumulated total distance cost to the expansion node and the distance disc between the newly registered node and the expansion node; as its previous node prev, the expansion node is adopted; its passing flag flg is set at "0"; and its position evaluation F is found by the coordinates of the newly registered node.

In conclusion, an object of modification of the accumulated total distance includes: a group of nodes including a node which is linked with a presently searched route and the accumulated total distance to which is newly found, and a node taking the above-described node as the relay point of the route from the departure point; and further a group of nodes taking a node, the accumulated total distance to which has been modified, as a new relay point of the route from the departure point. Of course, a node still giving the shortest accumulated total distance is not modified. Though such a complicated process is necessary, this preferred embodiment is still advantageous in that the shortest route can be obtained.

B-4. Third Preferred Embodiment

According to a third preferred embodiment, at the step S107 shown in FIG. 3, the accumulated total distance when the route passes the present expansion node is compared with the accumulated total distance which has already been registered in the list. Even if the former is shorter than the latter, the list is not modified as long as the passing flag flg of the node ahead of the link is "1", which will be described in detail, referring again to FIG. 13.

Figure 18:
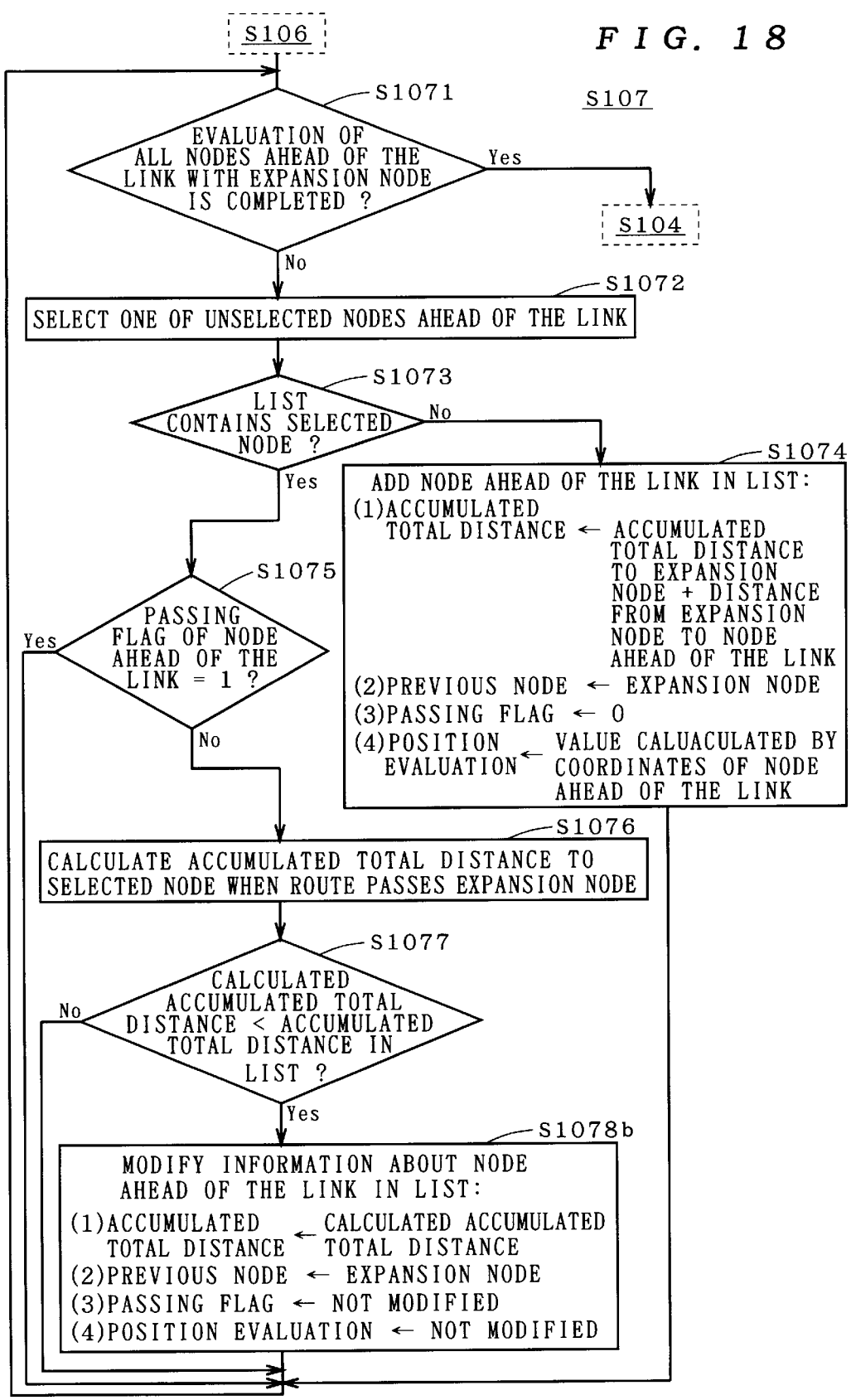
FIG. 18 is a flow chart illustrating a route search procedure according to the third preffered embodiment.

FIG. 18 is a flow chart illustrating the detail of the step S107 employed in this preferred embodiment. This step S107 is different from that shown in FIG. 15 of the second preferred embodiment in that a step S1075 is inserted between the steps S1073 and S1076 where, when the answer is "yes", the process returns to the step S1071 without taking the step S1076; and only when "no", the process proceeds to the step S1076.

As is the case with the second preferred embodiment, the process will be described from when the list becomes as shown in FIG. 14. The search area is extended from A1 to A2 at the step S109, and the node N3 is adopted as the expansion node. Thus, through the step S105, the process proceeds to the step S106 where the passing flag flg of the node N3 is set at "1", and then to the step S107. At the step S1072, the node S, not selected at the step S107, is first selected out of the nodes ahead of the link with the expansion node N3. Then, since the node S selected at the step S1072 has already been registered in the list, the process proceeds from the step S1073 to the step S1075.

At the step S1075, whether the passing flag flg of the node ahead of the link is "1" or not, more specifically, whether the accumulated total distance has been once determined or not, is judged. Since the passing flag flg of the node S is "1", the process returns to the step S1071 without taking the steps S1076 through S1078b, that is, without modifying the accumulated total distance.

The process of the step S1078b is substantially the same with that of the step S1078a. However, since the passing flag flg of the node ahead of the link to be processed at the step S1078b has turned out to be "0" at the step S1075, the passing flag flg is not modified at the step S1078b while it is set at "0" at the step S1078a. Thus, the process from the steps S1076 through S1078b corresponds to the following process as described in the first preferred embodiment: "When the node ahead of the link has already been registered in the list and its passing flag flg is "0", its accumulated total distance when the route passes the present expansion node is compared with the accumulated total distance which has already been registered in the list. When the former is shorter than the latter, the list is modified; when not, the list is not modified".

Then, the node N2 is selected at the step S1072, and, through the step S1075, the process returns to the step S1071. Since the evaluation of the nodes S and N2 as the nodes ahead of the link with the expansion node N3 is completed at the step S171, the process returns to the step S104.

At the step S104, the expansion node is selected. Since the node N2 is not processed at the step S1078a in this preferred embodiment, the passing flag flg of the node N2 is kept at "1", and only the node N4 is adopted as the expansion node. Then, through the step S105, the process proceeds to the step S106 where the passing flag flg of the node N4 is set at "1". The process after this is the same with the second preferred embodiment.

As described above, the route S→N1→N2→N4→E can be detected. Compared with the second preferred embodiment, the accumulated total distance of the route is not the shortest, but not the longest as well. Further, since the steps S1076 through the S1078b are not performed, less process is necessary to search the route.

B-5. Modification

Figure 19:
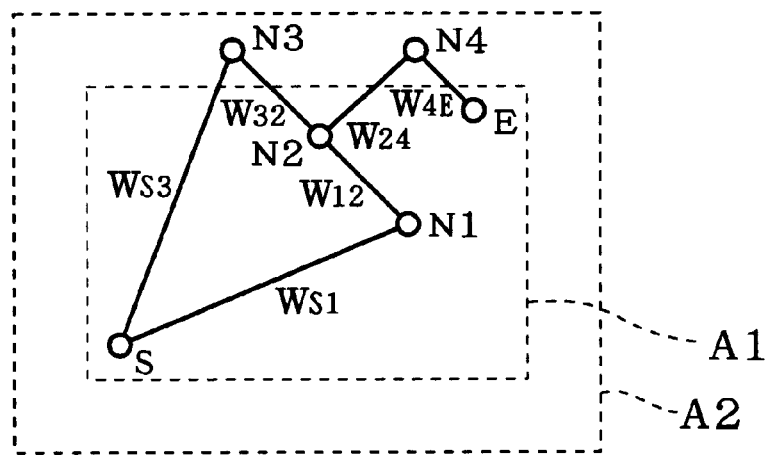
FIG. 19 illustrates a route search object according to a modification of the present invention.

As already described above, the first thought is not based on the assumption that the second thought is adopted. As shown in FIG. 19, for example, each process described in the second and third preferred embodiments can obviously be performed not only in the elliptical search areas A1 and A2 as shown in FIG. 13 but also in a rectangular search area.

While the invention has been described in detail, the foregoing description is in all aspects illustrative and not restrictive. It is understood that numerous other modifications and variations can be devised without departing from the scope of the invention.

We claim:

1. A route search method for searching a plurality of nodes linked with each other for a specific route from a departure point to a destination point, said plurality of nodes including said departure point and said destination point, said route search method comprising the steps of:
   a judging step of judging which of said plurality of nodes is adopted into said specific route in a search area including said departure point and said destination point,
   said judging step being repeated when said search area is updated, wherein said search area after being updated includes said search area before being updated, wherein
   said judging step includes the steps of:

(a) adopting one of said plurality of nodes as an expansion node from a list, said one being included in said search area and its passing flag being "0";
(b) setting said passing flag of said expansion node at "1"; and
(c) finding a node ahead of the link with said expansion node regardless of inside and outside said search area, and registering said node ahead of the link in said list along with said passing flag of "0" and an accumulated total distance from said departure point via said expansion node to said node ahead of the link, said step (c) returning to said step (a) after the registration.

2. The route search method as set forth in claim 1, wherein said step (c) includes the steps of:
(c-1) making a comparison, when said node ahead of the link has already been registered in said list, between said accumulated total distance which has already been registered in said list, and said accumulated total distance which is newly found, and then modifying said accumulated total distance by a shorter one; and
(c-2) registering said passing flag of said node ahead of the link as "0" in said list.

3. The route search method as set forth in claim 2, wherein said steps (c-1) and (c-2) are performed even if said passing flag of said node ahead of the link has already been registered as "0" in said list.

4. A route search method for searching a plurality of nodes linked with each other for a specific route from a departure point to a destination point, said plurality of nodes including said departure point and said destination point,
said route search method comprising the steps of:
a judging step of judging which of said plurality of nodes is adopted into said specific route in a search area including said departure point and said destination point,
said judging step being repeated when said search area is updated wherein said search area after being updated includes said search area before being updated,
wherein said search area is in the form of an ellipse which has two focal points including said departure point and said destination point, wherein
whether said one of said plurality of nodes is included in said search area or not is determined by comparing the sum of distances from a certain point of a boundary of said search area to each of said focal points, with the sum of distances from said one of said plurality of nodes to each of said focal points.

5. A route search method for searching a plurality of nodes linked with each other for a specific route from a departure point to a destination point, said plurality of nodes including said departure point and said destination point,
said route search method comprising the steps of:
a judging step of judging which of said plurality of nodes is adopted into said specific route in a search area including said departure point and said destination point,
said judging step being repeated when said search area is updated, wherein said search area after being updated includes said search area before being updated, wherein
said judging step includes the steps of:
(a) selecting an expansion node out of said plurality of nodes included in said search area;
(b) selecting a node linked with said expansion node as a node ahead of the link, regardless of inside and outside said search area;
(c) finding a distance from said departure point via said expansion node to said node ahead of the link;
(d) adopting a shorter one of said distances as an accumulated total distance to a first node ahead of the link, when said node ahead of the link obtained by said step (b) is common to said first node ahead of the link with a different expansion node, every time said step (c) is performed on said different expansion node; and
(e) finding said specific route by linking said expansion node giving said accumulated total distance adopted in said step (d),
wherein at least said steps (a) and (b) are performed on a node which as not been adopted as said expansion node yet.

6. The route search method as set forth in claim 5, wherein said search area is in the form of an ellipse focusing said departure point and said destination point.

7. The route search method as set forth in claim 5, wherein said steps (a) and (b) is performed also on a node which has already been adopted as said expansion node.

8. The route search method as set forth in claim 7, wherein said search area is in the form of an ellipse focusing said departure point and said destination point.

* * * * *